United States Patent
Ogawa et al.

(10) Patent No.: US 12,494,327 B2
(45) Date of Patent: Dec. 9, 2025

(54) ELECTRODE FOIL FOR ELECTROLYTIC CAPACITOR, AND ELECTROLYTIC CAPACITOR

(71) Applicant: Panasonic Intellectual Property Management Co., Ltd., Osaka (JP)

(72) Inventors: Miwa Ogawa, Osaka (JP); Naomi Kurihara, Osaka (JP); Mitsuhisa Yoshimura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 200 days.

(21) Appl. No.: 18/003,692

(22) PCT Filed: Jul. 15, 2021

(86) PCT No.: PCT/JP2021/026540
§ 371 (c)(1),
(2) Date: Dec. 29, 2022

(87) PCT Pub. No.: WO2022/024772
PCT Pub. Date: Feb. 3, 2022

(65) Prior Publication Data
US 2023/0274890 A1    Aug. 31, 2023

(30) Foreign Application Priority Data
Jul. 31, 2020 (JP) ................... 2020-130968

(51) Int. Cl.
*B32B 9/00* (2006.01)
*H01G 9/045* (2006.01)
*H01G 9/048* (2006.01)

(52) U.S. Cl.
CPC ............ *H01G 9/048* (2013.01); *H01G 9/045* (2013.01)

(58) Field of Classification Search
CPC ........ Y10T 428/30; H01G 9/048; H01G 9/045
USPC ........................................................ 428/408
See application file for complete search history.

(56) References Cited

U.S. PATENT DOCUMENTS

| | | |
|---|---|---|
| 2007/0236867 A1 | 10/2007 | Schott et al. |
| 2008/0094775 A1 | 4/2008 | Sneh et al. |
| 2008/0174939 A1 | 7/2008 | Kobayashi et al. |
| 2011/0310526 A1 | 12/2011 | Sneh et al. |

(Continued)

FOREIGN PATENT DOCUMENTS

| | | |
|---|---|---|
| JP | 2007-537360 A | 12/2007 |
| JP | 2008-507847 | 3/2008 |

(Continued)

OTHER PUBLICATIONS

International Search Report of PCT application No. PCT/JP2021/026540 dated Oct. 19, 2021.

*Primary Examiner* — Daniel H Miller
(74) *Attorney, Agent, or Firm* — Rimon P.C.

(57) ABSTRACT

An electrode foil for an electrolytic capacitor includes a base material containing a valve metal and a dissimilar metal composite layer covering a surface of the base material. The dissimilar metal composite layer includes a mixed region in which a first metal and a second metal are mixed. The second metal is different from the first metal. The mixed region constitutes at least 50% of the dissimilar metal composite layer in a thickness-wise direction of the dissimilar metal composite layer. Each of a content M1 of the first metal and a content M2 of the second metal with respect to all metals in the mixed region is 1 atomic % or more.

19 Claims, 3 Drawing Sheets

(56) References Cited

U.S. PATENT DOCUMENTS

2017/0103883 A1    4/2017   Ramvall
2018/0358181 A1   12/2018   Ogawa et al.
2020/0006011 A1    1/2020   Ogawa et al.

FOREIGN PATENT DOCUMENTS

| JP | 2008-198984 A | 8/2008 |
| WO | 2005/113852 A2 | 12/2005 |
| WO | 2017/154461 A1 | 9/2017 |
| WO | 2018/180029 | 10/2018 |

ELECTRODE FOIL FOR ELECTROLYTIC CAPACITOR, AND ELECTROLYTIC CAPACITOR

TECHNICAL FIELD

The present disclosure relates to an electrode foil for an electrolytic capacitor, and an electrolytic capacitor.

BACKGROUND

For example, a foil-like or plate-like base material containing a valve metal is used as an anode foil of an electrolytic capacitor. In order to increase the capacitance of the electrolytic capacitor, the surface of the base material usually has a porous portion. The porous portion is formed by etching the base material. By subjecting the base material to anodizing treatment, the surface of the base material (porous portion) is covered with a metal oxide (dielectric material) layer.

As the performance of the electronic apparatus equipped with the electrolytic capacitor is improved, the performance of the electrolytic capacitor is required to be improved. For example, it is required to increase relative dielectric constant of the dielectric layer and improve withstand voltage property. However, it is difficult to simultaneously improve the relative dielectric constant and the withstand voltage property by using one dielectric layer (metal oxide layer). Methods for simultaneously improving the relative dielectric constant and the withstand voltage property, for example, include the method in which the dielectric layer is constituted of two layers that include an oxide layer of a first metal advantageous for improving the relative dielectric constant and an oxide layer of a second metal, which is different from the first metal, advantageous for improving the withstand voltage property.

US 2017/0,103,883 proposes that a first metal oxide layer is formed using a first precursor and a second metal oxide layer is formed using a second precursor by an atomic layer deposition (ALD) method.

SUMMARY

An electrode foil for an electrolytic capacitor of an aspect of the present disclosure includes: a base material that contains a valve metal; and a dissimilar metal composite layer that covers a surface of the base material. The dissimilar metal composite layer includes a mixed region where a first metal and a second metal are mixed. The second metal is different from the first metal. The mixed region constitutes at least 50% of the dissimilar metal composite layer in a thickness-wise direction of the dissimilar metal composite layer. A content M1 of the first metal with respect to all metals in the mixed region is 1 atomic % or more, and a content M2 of the second metal with respect to all metals in the mixed region is 1 atomic % or more.

An electrolytic capacitor according to another aspect of the present disclosure includes the electrode foil for the electrolytic capacitor described above.

According to the present disclosure, an electrolytic capacitor having high performance and high reliability can be obtained.

DESCRIPTION OF EMBODIMENT

Figure 1:
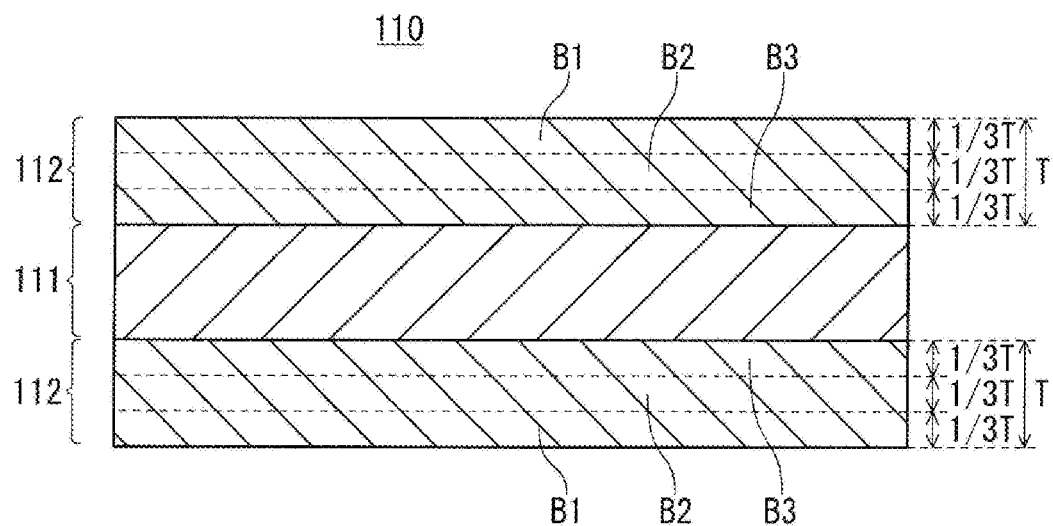
FIG. 1 is a schematic cross-sectional view illustrating a base material included in an electrode foil according to one exemplary embodiment of the present disclosure.

Prior to the description of exemplary embodiments, problems in the prior art will be briefly described below.

When a plurality of metal oxide layers are formed using a plurality of precursors by an ALD method to obtain a dielectric layer, the number of precursors supplied to a reaction chamber and the number of times (number of cycles) of supplying the precursors to the reaction chamber are increased, and thus, the amount of impurities derived from the precursors contained in the dielectric layer is increased. Thus, a leakage current may increase.

In the case of a dielectric layer having a two-layer structure, the distribution of the two types of metals is lopsided in a thickness-wise direction of the dielectric layer, and the performance of the electrode foil due to the two types of metals may fail to be stably obtained. For example, there may be localized areas where a metal oxide having poor insulation properties is present at a content ratio higher than a target value, resulting in degraded insulation properties and an increased leakage current.

Further, it is disclosed that the method includes subjecting a laminate of the first metal oxide layer and the second metal oxide layer to heat treatment to form a composite layer in which the first metal oxide and the second metal oxide are mixed. However, it is necessary to heat the laminate at a high temperature of 450° C. or higher during the heat treatment, and thus, the base material may be deteriorated or deformed by the heat. It is also difficult to uniformly heat the laminate, and the degree of heating varies greatly in the thickness-wise direction of the porous portion. Hence, it is difficult to adjust the ratio and the distribution degree of the first metal and the second metal, and the performance of the electrode foil cannot be stably obtained.

Further, it is disclosed that the method include forming an oxide layer of the second metal different from the first metal on a surface of the base material containing the first metal, and then forming an oxide layer of the first metal between the base material and the oxide layer of the second metal by subjecting the base material to an anodizing treatment. According to this method, a region in which an oxide of the first metal and an oxide of the second metal are mixed can be formed at a boundary between the oxide layer of the first metal and the oxide layer of the second metal. However, according to the method using such an anodizing treatment, the above-described region is formed merely with an extremely small thickness as compared with the oxide layer of the first metal and the oxide layer of the second metal. It is also difficult to adjust the ratio and the distribution degree of the first metal and the second metal. Hence, the performance of the electrode foil cannot be stably obtained.

When the base material provided with two layers of the first metal oxide layer and the second metal oxide layer formed on the surface is subjected to the anodizing treatment to repair defects in the two layers, the degree of repair of the two layers varies due to the metals contained in each of the two layers. And thus, the performance of the electrode foil may fail to be stably obtained.

In view of the above problems, the present disclosure provides an electrode foil for an electrolytic capacitor which is for providing an electrolytic capacitor having high performance and high reliability.

The electrode foil for the electrolytic capacitor according to the present exemplary embodiment includes a base material containing a valve metal and a dissimilar metal composite layer covering a surface of the base material. The dissimilar metal composite layer includes a mixed region in which the first metal and the second metal are mixed. The second metal is different from the first metal. The mixed region constitutes at least 50% of the dissimilar metal composite layer in the thickness-wise direction of the dissimilar metal composite layer. Content M1 of the first metal with respect to all metals in the mixed region is 1 atomic % or more, and content M2 of the second metal with respect to all metals in the mixed region is 1 atomic % or more.

The dissimilar metal composite layer can be formed by depositing the first metal and the second metal in atomic layer units by the atomic layer deposition (ALD) method using a precursor containing the first metal and a precursor containing the second metal, or one precursor containing the first metal and the second metal. Hence, it is easy to form the region where the first metal and the second metal are mixed with an appropriate thickness, and it is easy to adjust the ratio and the distribution degree of the first metal and the second metal. In the mixed region, the first metal and the second metal can each be uniformly distributed in the thickness-wise direction of the dissimilar metal composite layer. In the case of the ALD method, the influence of heat on the base material is also reduced. When the base material provided with the dissimilar metal composite layer on the surface is subjected to the anodizing treatment to repair defects in the dissimilar metal composite layer, variation in the degree of repair is suppressed because the first metal and the second metal are mixed. When one precursor containing the first metal and the second metal is used, the number of precursors supplied to the reaction chamber and the number of times (number of cycles) of supplying the precursors to the reaction chamber can be reduced. Thus, the amount of impurities derived from the precursors can be reduced. Hence, the increase in the leakage current due to the increase in the amount of impurities derived from the precursor is suppressed. As described above, the performance of the electrode foil due to the first metal and the second metal is stably obtained, and the electrolytic capacitor having high performance and high reliability is obtained.

The dissimilar metal composite layer includes at least the mixed region, and may include a region other than the mixed region. The region other than the mixed region includes a region containing the first metal and not containing the second metal, as well as a region containing the second metal and not containing the first metal. The first metal and/or the second metal may be the same as or different from the valve metal contained in the base material. The dissimilar metal composite layer may further include a third metal other than the first metal and the second metal. The third metal may be included in the mixed region or may be included in the region other than the mixed region.

The ratio of the thickness of the mixed region to the thickness of the dissimilar metal composite layer is 50% or more, may be 70% or more, and may be 90% or more. Meanwhile, the ratio of the thickness of the mixed region to the thickness of the dissimilar metal composite layer may be 100%. That is, the entire dissimilar metal composite layer may be constituted of the mixed region. The thickness of the mixed region is the thickness in the thickness-wise direction of the dissimilar metal composite layer in the mixed region.

When each of content M1 of the first metal and content M2 of the second metal with respect to all metals in the mixed region is 1 atomic % or more, the performance of the electrode foil due to the first metal and the second metal is sufficiently exhibited. Each of content M1 of the first metal and content M2 of the second metal with respect to all metals in the mixed region may be 1 atomic % or more and 99 atomic % or less, or may be respectively 1 atomic % or more and 70 atomic % or less.

The mixed region can be equally divided into three regions as region A1, region A2, and region A3, which are arranged in an order from a side close to the surface of the dissimilar metal composite layer in the thickness-wise direction of the dissimilar metal composite layer. It is preferable that the first metal and the second metal are uniformly distributed in regions A1 to A3. In this case, it is easy to stably obtain the performance of the electrode foil due to each metal, and it is easy to obtain an electrolytic capacitor having high performance and high reliability.

It is preferable that the variation in the atomic ratio of the first metal to the second metal is small in regions A1 to A3. Specifically, it is preferable that atomic ratio $R_{A1}$ of the first metal to the second metal in region A1, atomic ratio $R_{A2}$ of the first metal to the second metal in region A2, and atomic ratio $R_{A3}$ of the first metal to the second metal in region A3 satisfy the relations of $0.8 \leq R_{A2}/R_{A1} \leq 1.2$ and $0.8 \leq R_{A3}/R_{A2} \leq 1.2$. It is more preferable that $R_{A2}/R_{A1}$ and $R_{A3}/R_{A2}$ are 0.9 or more and 1.1 or less, respectively.

It is preferable that the variation in the content of the first metal with respect to all metals is small in regions A1 to A3. Specifically, it is preferable that content $M1_{A1}$ (atomic %) of the first metal with respect to all metals in region A1, content $M1_{A2}$ (atomic %) of the first metal with respect to all metals in region A2, and content $M1_{A3}$ (atomic %) of the first metal with respect to all metals in region A3 satisfy the relations of $0.9 \leq M1_{A2}/M1_{A1} \leq 1.1$ and $0.9 \leq M1_{A3}/M1_{A2} \leq 1.1$. Further, it is preferable that each of $M1_{A1}$, $M1_{A2}$, and $M1_{A3}$ is 1 atomic % or more.

It is preferable that the variation in the content of the second metal with respect to all metals is small in regions A1 to A3. Specifically, it is preferable that content $M2_{A1}$ (atomic %) of the second metal with respect to all metals in region A1, content $M2_{A2}$ (atomic %) of the second metal with respect to all metals in region A2, and content $M2_{A3}$ (atomic %) of the second metal with respect to all metals in region A3 satisfy the relations of $0.9 \leq M2_{A2}/M2_{A1} \leq 1.1$ and $0.9 \leq M2_{A3}/M2_{A2} \leq 1.1$. Further, it is preferable that each of $M2_{A1}$, $M2_{A2}$, and $M2_{A3}$ is 1 atomic % or more.

The base material may have a porous portion and a core portion continuous with the porous portion, and the dissimilar metal composite layer may cover a surface of the porous portion. The base material is an integrated body of the core portion and the porous portion. As the base material, a metal foil containing the valve metal is used. The base material is obtained by, for example, etching the metal foil. The porous portion is a surface side (outer side) portion of the metal foil made porous by etching, and the remaining portion which is an inner side portion of the metal foil is the core portion. The porous portion has pits or pores surrounded by a metal skeleton containing the valve metal. The dissimilar metal composite layer is provided in a manner of covering at least a part of the surface of the metal skeleton constituting the porous portion (the metal skeleton surrounding the pits or pores).

(First Metal to Third Metal)

It is preferable that the first metal includes at least one selected from the group consisting of titanium (Ti), tantalum (Ta), hafnium (Hf), zirconium (Zr), and zinc (Zn) from the viewpoint of being advantageous in improving the relative dielectric constant of the dielectric layer.

Particularly, it is more preferable that the first metal includes at least one selected from the group consisting of titanium and tantalum (hereinafter referred to as titanium or the like). Titanium or the like is advantageous in improving corrosion resistance and insulation properties, and can achieve higher performance and longer life of the electrolytic capacitor. Since defects such as deterioration and short circuit of the electrolytic capacitor are likely to occur on the surface side of the porous portion, a large amount of titanium or the like may be contained on the surface side of the porous portion. In the case of titanium, it is easy to obtain an effect such as an improvement in insulation properties particularly for an electrolytic capacitor having a low rated voltage.

It is preferable that the second metal includes at least one selected from the group consisting of silicon (Si) and aluminum (Al) (hereinafter referred to as silicon or the like). Silicon or the like is advantageous in improving the withstand voltage property of the dielectric layer. Meanwhile, silicon or the like is also advantageous in improving the insulating properties. A large amount of silicon or the like may be contained on the core portion side of the porous portion where defects of the dielectric layer are likely to occur.

The contents of the first metal and the second metal in the dissimilar metal composite layer may respectively be varied in the thickness-wise direction of the porous portion. Depending on the application of the electrolytic capacitor, the performance (withstand voltage, capacitance, etc.) required for the electrolytic capacitor, the characteristics of the metals selected respectively as the first metal and the second metal, and the like, the amount of the first metal may be increased on the surface side of the porous portion, and the amount of the second metal may be increased on the core portion side of the porous portion. The amount of the second metal may be increased on the surface side of the porous portion, and the amount of the first metal may be increased on the core portion side of the porous portion.

It is preferable that the first metal is titanium, the second metal is silicon, and a content of silicon with respect to all metals in the mixed region is 1 atomic % or more and 70 atomic % or less. In this case, the effects of improving the relative dielectric constant and the withstand voltage property of the dielectric layer can be easily obtained at the same time. The ALD method may be used to increase the content of silicon, which is advantageous in improving the withstand voltage property, on the core portion side of the porous portion where defects of the dielectric layer are likely to occur. The content of titanium, which is advantageous in improving corrosion resistance, may be increased on the surface side of the porous portion where corrosion of the base material is likely to occur. Thereby, the performance of the electrode foil can be more efficiently improved.

It is preferable that the first metal is titanium, the second metal is aluminum, and a content of aluminum with respect to all metals in the mixed region is 1 atomic % or more and 55 atomic % or less. In this case, the effects of improving the relative dielectric constant and the withstand voltage property of the dielectric layer can be easily obtained at the same time. The ALD method may be used to increase the content of aluminum, which is advantageous in improving the withstand voltage property, on the core portion side of the porous portion where defects of the dielectric layer are likely to occur. The content of titanium, which is advantageous in improving corrosion resistance, may be increased on the surface side of the porous portion where corrosion of the base material is likely to occur. Thereby, the performance of the electrode foil can be more efficiently improved.

From the viewpoint of further improving the dielectric constant, Zr may be used together with Ti as the first metal. From the viewpoint of further improving the withstand voltage property, Al may be used together with Si as the second metal.

Examples of the third metal include niobium (Nb), etc. Nb is advantageous in improving the relative dielectric constant of the dielectric layer.

(Anode Foil)

The dissimilar metal composite layer may be an oxide layer. In this case, the oxide layer functions as a dielectric layer and the electrode foil can be used as an anode foil. By using a metal advantageous in improving the relative dielectric constant of the dielectric layer as the first metal and using a metal advantageous in improving the withstand voltage property of the dielectric layer as the second metal, the relative dielectric constant and the withstand voltage property of the dielectric layer can be improved at the same time. In the case of anode foil, the mixed region may contain the first metal and the second metal as the first metal oxide and the second metal oxide, or as a composite oxide of the first metal and the second metal.

The mixed region may contain impurities. The impurities are at least one selected from the group consisting of hydrogen, carbon, and nitrogen. The precursor used in the ALD method may contain the above-described impurities. Content Mi of the impurities in the mixed region is preferably 25 atomic % or less, more preferably 15 atomic % or less, with respect to the total of all metals and the impurities in the mixed region. When the dissimilar metal composite layer is an oxide layer (dielectric layer) and the electrode foil is used as the anode foil, high content of impurities may cause the leakage current increase. When one precursor including the first metal and the second metal is used, the content of the impurities is easily reduced to within the above range, and the increase in the leakage current due to the impurities is easily suppressed. In particular, the content of hydrogen in the mixed region is suppressed to 10 atomic % or less with respect to the total of all metals and the impurities in the mixed region.

(Cathode Foil)

The dissimilar metal composite layer may be a conductive layer. In this case, the electrode foil can be used as a cathode foil. The first metal and the second metal may be used in combination with a metal advantageous in improving corrosion resistance and conductivity. For example, titanium and tantalum may be used in combination. This case is advantageous in terms of improvement in productivity and reduction in manufacturing cost.

From the viewpoint of improving the conductivity of the conductive layer, the dissimilar metal composite layer (conductive layer) may further contain a conductive carbon. The dissimilar metal composite layer may include a region where the first metal, the second metal, and the conductive carbon are mixed. The content of the conductive carbon with respect to the total of all metals and the conductive carbon in the mixed region may be, for example, 10 atomic % or more and 95 atomic % or less. Meanwhile, the dissimilar metal composite layer may be constituted of a region (mixed layer) where the first metal and the second metal are mixed and a conductive carbon layer.

Figure 2:
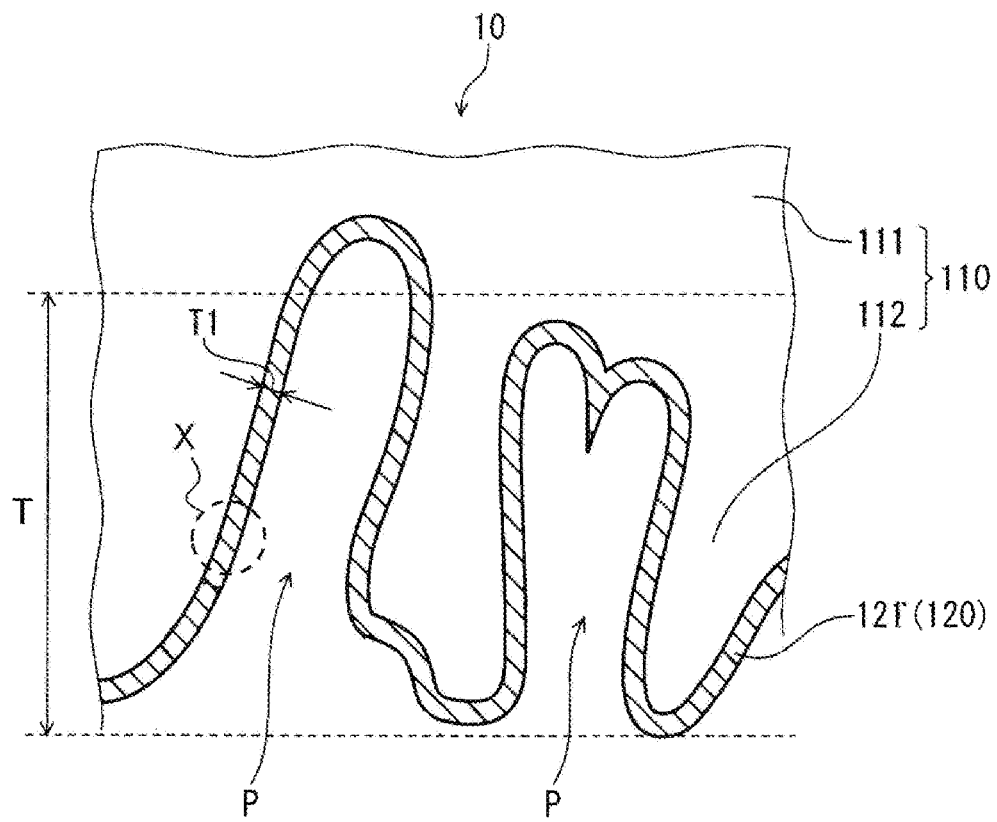
FIG. 2 is an enlarged schematic cross-sectional view illustrating g a part of a porous portion whose surface is covered with a dissimilar metal composite layer in an electrode foil according to one exemplary embodiment of the present disclosure.
Figure 3:
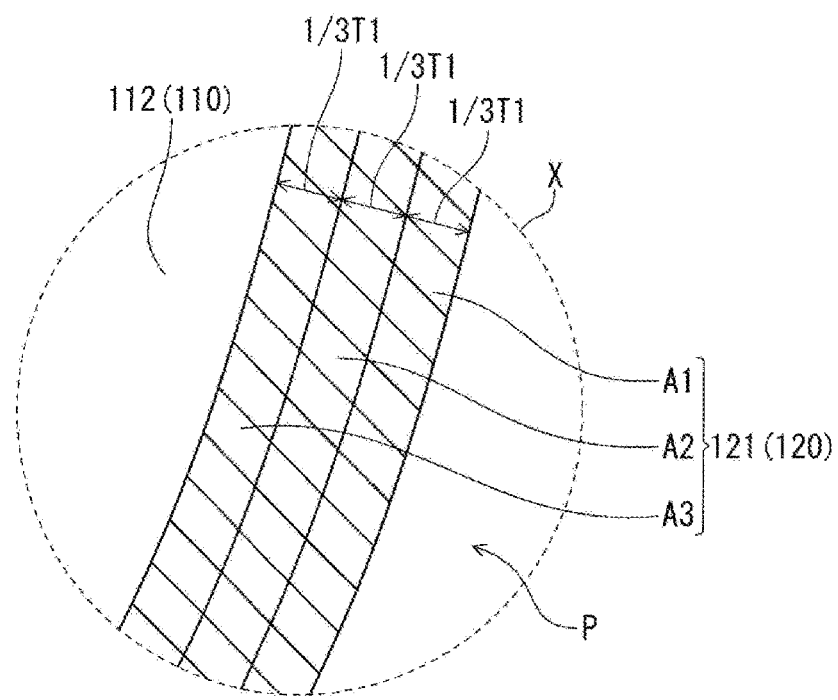
FIG. 3 is an enlarged schematic cross-sectional view illustrating portion X of FIG. 2.

Here, FIG. 1 is a cross-sectional view schematically illustrating a base material included in an electrode foil according to one exemplary embodiment of the present disclosure. FIG. 2 is an enlarged schematic cross-sectional view illustrating a part of a porous portion having a dissimilar metal composite layer in an electrode foil according to one exemplary embodiment of the present disclosure. FIG. 3 is an enlarged schematic cross-sectional view illustrating portion X of FIG. 2.

Electrode foil 10 includes base material 110 containing a valve metal and dissimilar metal composite layer 120 (first layer 121) covering a surface of base material 110. Base material 110 includes porous portion 112 and core portion 111 continuous with porous portion 112. Base material 110 is an integrated body of core portion 111 and porous portion 112. As shown in FIG. 2, dissimilar metal composite layer 120 covers the surface of porous portion 112. Porous portion 112 has a large number of pits (pores) P surrounded by the metal skeleton containing the valve metal. Dissimilar metal composite layer 120 covers the surface of the metal skeleton of porous portion 112. That is, dissimilar metal composite layer 120 covers the outer surface of porous portion 112 and the inner wall surfaces of pits (pores) P.

Entire dissimilar metal composite layer 120 is constituted of a mixed region where the first metal and the second metal different from the first metal are mixed. Dissimilar metal composite layer (mixed region) 120 has thickness T1. In the present exemplary embodiment, the entire dissimilar metal composite layer is constituted of the mixed region, but the mixed region may constitute 50% or more of the thickness of the dissimilar metal composite layer.

As shown in FIG. 1, porous portion 112 can be equally divided into three regions as region B1, region B2, and region B3, which are arranged in an order from a side opposite to core portion 111 in the thickness-wise direction of porous portion 112. That is, each of regions B1 to B3 has a thickness of ⅓T, where T is the thickness of porous portion 112. Thickness T of porous portion 112 can be obtained by cutting electrode foil 10 so as to obtain a cross section in the thickness-wise direction of core portion 111 and porous portion 112, obtaining an image of the cross section by a scanning electron microscope (SEM), and obtaining an average value of thicknesses at arbitrary ten points in the porous portion.

Content $M1_{B1}$ (atomic %) of the first metal with respect to all metals in region B1, content $M1_{B2}$ (atomic %) of the first metal with respect to all metals in region B2, and content $M1_{B3}$ (atomic %) of the first metal with respect to all metals in region B3 satisfy the relation of $1 \leq (M1_{B1}+M1_{B2}+M1_{B3})/3$. The content of the first metal with respect to all metals in region B1 means the content of the first metal with respect to all metals in the mixed region covering the surface of the porous portion in region B1. The same applies to the content of the first metal with respect to all metals in region B2 and the content of the first metal with respect to all metals in region B3.

Content $M2_{B1}$ (atomic %) of the second metal with respect to all metals in region B1, content $M2_{B2}$ (atomic %) of the second metal with respect to all metals in region B2, and content $M2_{B3}$ (atomic %) of the second metal with respect to all metals in region B3 satisfy the relation of $1 \leq (M2_{B1}+M2_{B2}+M2_{B3})/3$. The content of the second metal with respect to all metals in B1 region means the content of the second metal with respect to all metals in the mixed region covering the surface of the porous portion in region B1. The same applies to the content of the second metal with respect to all metals in region B2 and the content of the second metal with respect to all metals in region B3.

The contents of the first metal and the second metal in the mixed region covering the surface of the porous portion may respectively be varied in the thickness-wise direction of porous portion 112 (regions B1 to B3). For example, the content of the metal which is advantageous in improving corrosion resistance as the first metal may be increased on the surface side (region B1) of the porous portion relative to on the core portion side (region B3) of the porous portion. The content of the metal which is advantageous in improving withstand voltage property as the second metal may be increased on the core portion side (region B3) of the porous portion relative to on the surface side (region B1) of the porous portion.

Atomic ratio $R_{B1}$ of the first metal to the second metal in region B1, atomic ratio $R_{B2}$ of the first metal to the second metal in region B2, and atomic ratio $R_{B3}$ of the first metal to the second metal in region B3 may satisfy a relation of $R_{B3}<R_{B2}<R_{B1}$. The atomic ratio of the first metal to the second metal in region B1 means the atomic ratio of the first metal to the second metal in the mixed region covering the surface of the porous portion in region B1. The same applies to the atomic ratio of the first metal to the second metal in region B2 and the atomic ratio of the first metal to the second metal in region B3. Each of $R_{B2}/R_{B1}$ and $R_{B3}/R_{B2}$ may be 0.05 or more and 0.95 or less, 0.1 or more and 0.75 or less, or 0.15 or more and 0.65 or less.

$M1_{B3}<M1_{B2}<M1_{B1}$ may be satisfied. Each of $M1_{B2}/M1_{B1}$ and $M1_{B3}/M1_{B2}$ may be 0.05 or more and 0.95 or less, 0.1 or more and 0.75 or less, or 0.15 or more and 0.65 or less.

$M2_{B1}<M2_{B2}<M2_{B3}$ may be satisfied. Each of $M2_{B2}/M2_{B3}$ and $M2_{B1}/M2_{B2}$ may be 0.05 or more and 0.95 or less, 0.1 or more and 0.75 or less, or 0.15 or more and 0.65 or less.

As shown in FIG. 3, the mixed region (dissimilar metal composite layer 120) can be equally divided into three regions as region A1, region A2, and region A3, which are arranged in an order from a side close to the surface of dissimilar metal composite layer 120 in the direction of thickness T1 of dissimilar metal composite layer 120. Preferably, in any of regions B1 to B3, the variation in the distribution of the first metal and the second metal among region A1 to region A3 is small. In this case, it is easy to stably obtain the performance of the electrode foil due to each metal, and it is easy to obtain an electrolytic capacitor having high performance and high reliability.

Preferably, in any of regions B1 to B3, the variation in the atomic ratio of the first metal to the second metal among regions A1 to A3 is small, and each of $R_{A2}/R_{A1}$ and $R_{A3}/R_{A2}$ may be 0.8 or more and 1.2 or less, more preferably 0.9 or more and 1.1 or less.

Preferably, in any of regions B1 to B3, the variation in the content of the first metal to all metals among regions A1 to A3 is small, and each of $M1_{A2}/M1_{A1}$ and $M1_{A3}/M1_{A2}$ may be 0.9 or more and 1.1 or less. Preferably, at least in region B1, each of $M1_{A1}$, $M1_{A2}$, and $M1_{A3}$ may be 1 atomic % or more.

Preferably, in any of regions B1 to B3, the variation in the content of the second metal to all metals among regions A1 to A3 is small, and each of $M2_{A2}/M2_{A1}$ and $M2_{A3}/M2_{A2}$ may be 0.9 or more and 1.1 or less. Preferably, at least in region B3, each of $M2_{A1}$, $M2_{A2}$, and $M2_{A3}$ may be 1 atomic % or more.

The distribution and concentration of each element in the mixed region can be analyzed by element mapping using energy dispersive X-ray spectroscopy (EDX).

The contents of the first metal and the second metal in the mixed region can be obtained using the following method.

The electrode foil is cut to obtain a cross section in the thickness-wise direction of the porous portion, thereby obtaining a sample cross section. The sample cross section is observed using a scanning electron microscope (SEM) to confirm the dissimilar metal composite layer covering the surface of the porous portion. The dissimilar metal composite layer is subjected to the element mapping using EDX to confirm the mixed region of the first metal and the second metal. Content M1 of the first metal and content M2 of the second metal in the mixed region are respectively obtained.

Specifically, the porous portion is divided into regions B1 to B3 using an SEM image of the sample cross section. The contents of the first metal at arbitrary ten locations in the mixed region covering the surface of region B1 are respectively obtained, and the average value of these contents is obtained as content $M1_{B1}$ of the first metal in the mixed region of region B1. Content $M1_{B2}$ of the first metal in the mixed region of region B2 and content $M1_{B3}$ of the first metal in the mixed region of region B3 are obtained in the same manner. The average value of $M1_{B1}$ to $M1_{B3}$ is obtained as content M1 of the first metal in the mixed region.

The contents of the second metal at arbitrary ten locations in the mixed region covering the surface of region B1 are respectively obtained, and the average value of these contents is obtained as content $M2_{B1}$ of the second metal in the mixed region of region B1. Content $M2_{B2}$ of the second metal in the mixed region of region B2 and content $M2_{B3}$ of the second metal in the mixed region of region B3 are obtained in the same manner. The average value of $M2_{B1}$ to $M2_{B3}$ is obtained as content M2 of the second metal in the mixed region.

$R_{B1}$, $R_{B2}$, and $R_{B3}$ may be obtained by calculating $M1_{B1}/M2_{B1}$, $M1_{B2}/M2_{B2}$, and $M1_{B3}/M2_{B3}$, respectively.

The content of impurities (H, C, and N) in the mixed region can be obtained using the following method.

The contents of impurities at arbitrary ten locations in the mixed region covering the surface of region B1 are obtained, and the average value of these contents is obtained as content $Mi_{B1}$ of the impurities in the mixed region of region B1. Content $Mi_{B2}$ of the impurities in the mixed region of region B2 and content $Mi_{B3}$ of the impurities in the mixed region of region B3 are obtained in the same manner. The average value of $Mi_{B1}$ to $Mi_{B3}$ is obtained as content Mi of the impurities in the mixed region.

The contents of the first metal and the second metal in regions A1 to A3 can be obtained using the following method.

Any one region of regions B1 to B3 is selected using the SEM image of the sample cross section, and the mixed region covering the surface of the selected region is further divided into regions A1 to A3. Element mapping by EDX analysis is performed to obtain the contents of the first metal and the second metal in regions A1 to A3. Specifically, the contents of the first metal at arbitrary ten locations in region A1 are respectively obtained, and the average value of these contents is obtained as content $M1_{A1}$ of the first metal in region A1. Content $M1_{A2}$ of the first metal in region A2 and content $M1_{A3}$ of the first metal in region A3 are obtained in the same manner. The contents of the second metal at arbitrary ten locations in region A1 are respectively obtained, and the average value of these contents is obtained as content $M2_{A1}$ of the second metal in region A1. Content $M2_{A2}$ of the second metal in region A2 and content $M2_{A3}$ of the second metal in region A3 are obtained in the same manner.

$R_{A1}$, $R_{A2}$, and $R_{A3}$ may be obtained by calculating $M1_{A1}/M2_{A1}$, $M1_{A2}/M2_{A2}$ and $M1_{A3}/M2_{A3}$, respectively.

(Second Layer)

From the viewpoint of further improving the performance of the electrode foil, the electrode foil may include a layer (second layer) containing an oxide of the valve metal between the base material and the dissimilar metal composite layer (first layer). The second layer can be formed by subjecting the electrode foil provided with the first layer on the surface to a anodizing treatment. The thickness of the second layer can be controlled based on a voltage applied to the electrode foil.

In the case of an anode foil in which the first layer is an oxide layer, defects of the first layer are repaired by the anodizing treatment (formation of the second layer), and the performance of the anode foil such as withstand voltage property is further improved. Since the first metal and the second metal are mixed, variation in the degree of repair is suppressed. Defects of the first layer occur, for example, in a manufacturing process of the electrolytic capacitor such as a cutting process of the metal foil or a forming process of a wound body. It is preferable that the base material contains a valve metal suitable for anodization (for example, Al).

In the case of a cathode foil in which the first layer is a conductive layer, the formation of the second layer suppresses the reaction between the base material and the electrolyte, thereby suppressing the deterioration of the cathode foil. Meanwhile, when a anodization film (second layer) is formed, capacitance can also be generated on the cathode side. When capacitance is generated on the cathode side in addition to the anode side, the capacitance (total capacitance) of the electrolytic capacitor as a whole decreases. However, it is possible to suppress a decrease in the capacitance of the entire electrolytic capacitor by forming an oxide film (second layer) having an appropriate thickness on the roughened cathode foil to intentionally increase the capacitance on the cathode side. When the electrode foil is used as the cathode foil, a thinner anodization film is preferred.

Figure 4:
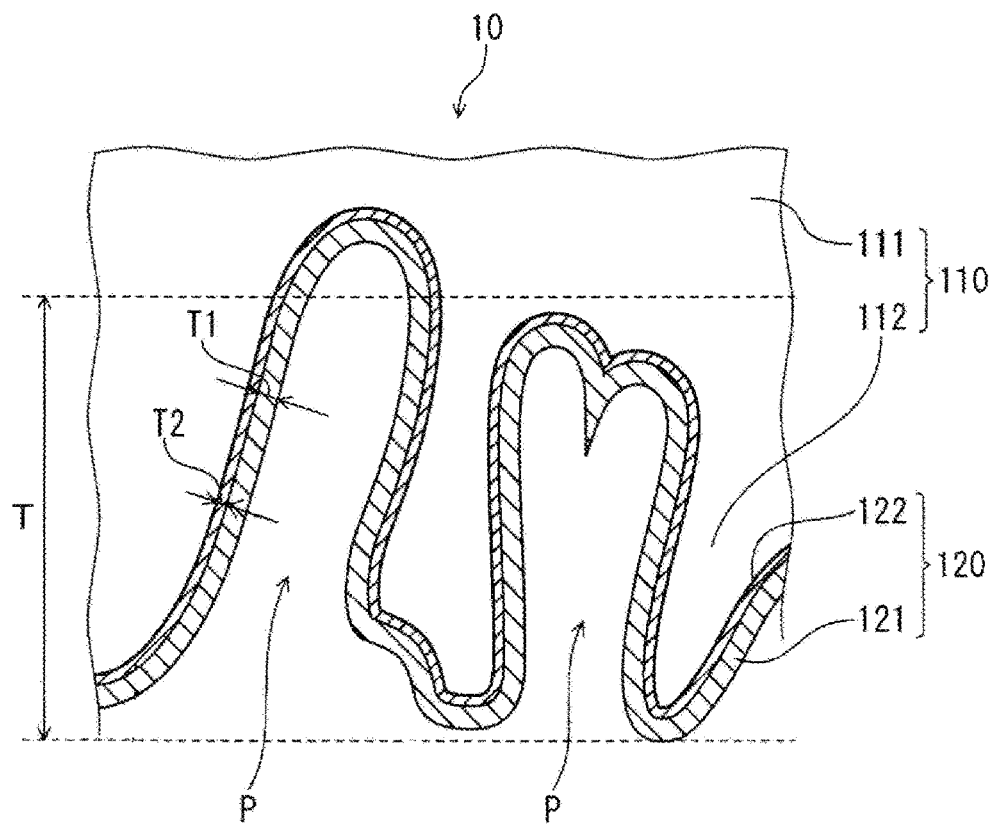
FIG. 4 is an enlarged schematic cross-sectional view illustrating a part of a porous portion whose surface is covered with a dissimilar metal composite layer in an electrode foil according to another exemplary embodiment of the present disclosure.

Here, FIG. 4 is an enlarged schematic cross-sectional view illustrating a part of a porous portion whose surface is covered with a dissimilar metal composite layer in an electrode foil according to another exemplary embodiment of the present disclosure.

As shown in FIG. 4, in electrode foil 10, second layer 122 having thickness T2 may be formed between the metal skeleton constituting porous portion 112 and first layer 121 having thickness Ti. The second layer is an oxide layer of the valve metal derived from base material 110.

Thickness T1 of the first layer may be greater than thickness T2 of the second layer. When the first layer is formed using the ALD method, it is also easy to adjust to T2<T1 in region B3 deep in the pit. In the case of the anode foil, it is easy to obtain the effect of simultaneously improving the relative dielectric constant and the withstand voltage property of the dielectric layer due to the first layer. In the case of the cathode foil, it is possible to reduce the influence of the cathode side capacitance due to the second layer on the capacitance of the entire electrolytic capacitor. T1/T2 may be two or more and may be three or more.

In the case of the anode foil, thickness T1 of the dissimilar metal composite layer (first layer) may be 100 nm or more and 50000 nm or less, or may be 500 nm or more and 30000 nm or less. Thickness T2 of the second layer may be 500 nm or more and 30000 nm or less, or may be 1000 nm or more and 35000 nm or less.

In the case of the cathode foil, thickness T1 of the dissimilar metal composite layer (first layer) may be 20 nm or more and 20000 nm or less, or may be 50 nm or more and 10000 nm or less. Thickness T2 of the second layer may be 25 nm or more and 25000 nm or less, or may be 50 nm or more and 20000 nm or less.

Thickness T1 of the first layer is obtained by cutting the electrode foil to obtain a cross section in the thickness-wise direction of the porous portion, obtaining an SEM image of the cross section, measuring the thickness at each of arbitrarily selected ten points, and averaging these measured values. Thickness T2 of the second layer is obtained by the same procedure as that for the first layer.

The thickness of the porous portion is not particularly limited, and may be appropriately selected according to the application of the electrolytic capacitor, a required withstand voltage, and the like. The thickness of the porous portion may be selected from, for example, a range from 10 µm to 160 µm, inclusive. Meanwhile, the thickness of the porous portion may be, for example, 1/10 or more and 5/10 or less of the thickness of the base material.

A pore diameter peak of the pit or pore of the porous portion is not particularly limited, but may be, for example, 50 nm or more and 2000 nm or less, or 100 nm or more and 300 nm or less from the viewpoint of increasing a surface area and forming the dissimilar metal composite layer up to a deep portion of the porous portion. The pore diameter peak is a model pore diameter of a volume-based pore diameter distribution measured by, for example, a mercury porosimeter.

The withstand voltage of the electrolytic capacitor is not particularly limited, for example, the electrolytic capacitor may have a relatively low withstand voltage of 1 V or more and less than 4 V, or may have a relatively high withstand voltage of 4 V or more, 15 V or more, or 100 V or more. Preferably, when an electrolytic capacitor having a withstand voltage of 4 V or more is obtained, the dissimilar metal composite layer functioning as the dielectric layer has a thickness of 4 nm or more. Preferably, when an electrolytic capacitor having a withstand voltage of 15 V or more is obtained, the dissimilar metal composite layer functioning as the dielectric layer has a thickness of 21 nm or more.

More specifically, for example, when an electrolytic capacitor having a high withstand voltage of 60 V or more is obtained, the pore diameter peak of the porous portion may be, for example, 50 nm or more and 300 nm or less, the thickness of the porous portion may be, for example, 30 µm or more and 160 µm or less, and the thickness of the dissimilar metal composite layer functioning as the dielectric layer may be, for example, 30 nm or more and 100 nm or less.

In the case of an electrolytic capacitor having a withstand voltage of an electrode foil of, for example, 100 V or more, the shape of the etching pit may be a substantially columnar, conical or truncated conical shape extending in a tunnel shape from the surface side of the base material toward the core portion side of the base material, with the pit diameter on the surface side of the base material being large and the pit diameter on the core portion side of the base material being small. A portion of the columnar pit may penetrate the base material.

When an electrolytic capacitor having a relatively low withstand voltage, for example, a withstand voltage of 10 V or less, is obtained, the pore diameter peak of the porous portion may be, for example, 20 nm or more and 200 nm or less, the thickness of the porous portion may be, for example, 30 µm or more and 160 µm or less, and the thickness of the dissimilar metal composite layer functioning as the dielectric layer may be, for example, 4 nm or more and 30 nm or less.

(Method for Producing Electrode Foil)

The method for producing the electrode foil includes, for example, a first step of preparing the base material having the porous portion and the core portion continuous with the porous portion, and a second step of forming the dissimilar metal composite layer covering the surface of the metal skeleton constituting the porous portion.

(First Step)

In the first step of preparing the base material, for example, the metal foil containing the valve metal is etched to roughen the surface of the metal foil. Through the roughening, the porous portion having a plurality of pits or pores is formed on the surface of the metal foil. At the same time, the core portion integrated with the porous portion is formed in the inner portion of the metal foil. The etching can be performed by, for example, direct current etching using direct current or alternating current etching using alternating current.

The valve metal is not particularly limited, and aluminum (Al), tantalum (Ta), niobium (Nb), etc. can be used from the viewpoint that the second layer can be easily formed by the anodizing treatment. The thickness of the metal foil is not particularly limited, and is, for example, 15 µm or more and 300 µm or less. The valve metal may be contained in the base material as an alloy or a compound containing the valve metal.

(Second Step)

For example, a vapor phase method is used to form the dissimilar metal composite layer. As the vapor phase method, for example, a vacuum vapor deposition method, a chemical vapor deposition method, a mist vapor deposition method, a sputtering method, a pulsed laser deposition method, an atomic layer deposition method (ALD method), etc. can be selected. Among these methods, the ALD method is excellent in that a dense dissimilar metal composite layer can be formed up to the deep portion of the porous portion.

In the ALD method, a dissimilar element composite layer can be formed on a surface of an object by supplying a source gas to a reaction chamber in which the object is arranged. As the source gas, a precursor gas containing the first metal and the second metal may be used, or a precursor gas containing the first metal and a precursor gas containing the second metal may be used. In the ALD method, a self-limiting action functions, and thus, the first metal and the second metal are deposited on the surface of the object in atomic layer units. Therefore, the ALD method can easily control the thickness of the dissimilar element composite layer to be formed. The thickness of the dissimilar metal composite layer is controlled by the number of times (number of cycles) of supplying the source gas to the reaction chamber.

In the ALD method, since the first metal and the second metal are deposited on the surface of the object in atomic layer units, a layer in which the first metal and the second metal are mixed is easily formed, and the contents of the first metal and the second metal are easily adjusted. In the ALD method, the first metal and the second metal can be uniformly distributed in the thickness-wise direction (regions A1 to A3) of the dissimilar metal composite layer.

When the dissimilar metal composite layer is formed as an oxide layer, the following step (i) may be repeated as one cycle.

Step (i): supply of precursor gas containing the first metal and the second metal→exhaust (purge) of precursor gas containing the first metal and the second metal→supply of oxidizing agent→exhaust (purge) of oxidizing agent By repeating step (i) to deposit the first metal and the second metal in atomic layer units, a dissimilar metal composite layer (oxide layer) in which the first metal and the second metal are mixed is formed.

Further, when the dissimilar metal composite layer is formed as an oxide layer, the following step (ii) may be repeated as one cycle.

Step (ii): supply of precursor gas containing the first metal→exhaust (purge) of precursor gas containing the first metal→supply of oxidizing agent→exhaust (purge) of oxidizing agent→supply of precursor gas containing the second metal→exhaust (purge) of precursor gas containing the second metal→supply of oxidizing agent→exhaust (purge) of oxidizing agent By repeating step (ii) to alternately deposit the first metal and the second metal in atomic layer units, a dissimilar metal composite layer (oxide layer) in which the first metal and the second metal are mixed is formed.

Further, when the dissimilar metal composite layer is formed as an oxide layer, the following step (iii) may be repeated as one cycle.

Step (iii): supply of precursor gas containing the first metal→exhaust (purge) of precursor gas containing the first metal→supply of precursor gas containing the second metal→exhaust (purge) of precursor gas containing the second metal→supply of oxidizing agent→exhaust (purge) of oxidizing agent By repeating step (iii) to alternately deposit the first metal and the second metal in atomic layer units, a dissimilar metal composite layer (oxide layer) in which the first metal and the second metal are mixed is formed.

When the dissimilar metal composite layer is formed as a conductive layer, the following step (iv) may be repeated as one cycle.

Step (iv): supply of precursor gas containing the first metal and the second metal→exhaust (purge) of precursor gas containing the first metal and the second metal By repeating step (iv) to deposit the first metal and the second metal in atomic layer units, a dissimilar metal composite layer (conductive layer) in which the first metal and the second metal are mixed is formed.

Further, when the dissimilar metal composite layer is formed as a conductive layer, the following step (v) may be repeated as one cycle.

Step (v): supply of precursor gas containing the first metal→exhaust (purge) of precursor gas containing the first metal→supply of precursor gas containing the second metal→exhaust (purge) of precursor gas containing the second metal By repeating step (v) to alternately deposit the first metal and the second metal in atomic layer units, a dissimilar metal composite layer (conductive layer) in which the first metal and the second metal are mixed is formed.

In the case of step (i) and step (iv), the intended dissimilar metal composite layer can be efficiently formed in a small number of cycles using one type of precursor. Therefore, the content of impurities derived from the precursor in the dissimilar metal composite layer can be reduced.

In the case of step (i) and step (vi), the contents of the first metal and the second metal may be changed in the thickness-wise direction (regions B1 to B3) of the porous portion by utilizing the difference in the entry speed into the pit of the metals contained in the precursor. A metal (for example, Ti or Ta) having a low entry speed into the pit may be selected as one of the first metal and the second metal, and a metal (for example, Si) having a high entry speed into the pit may be selected as the other of the first metal and the second metal. In this case, the content of the one of the first metal and the second metal can be increased on the surface side (region B1) of the porous portion and the content of the other of the first metal and the second metal can be increased on the core portion side (region B3) of the porous portion.

In the case of step (ii), step (iii), and step (v), the contents of the first metal and the second metal may be changed in the thickness-wise direction (regions B1 to B3) of the porous portion by utilizing the difference in the film forming speed (entry speed into the pit of the precursor containing the first metal and the precursor containing the second metal) between the two films alternately formed in atomic layer units by the ALD method. When the film forming speed is high, the film is more easily formed up to the deep portion of the pit, and when the film forming speed is low, the film is less easily formed in the deep portion of the pit. For example, a metal (for example, Ti or Ta) having a low film forming speed may be selected as one of the first metal and the second metal, and a metal (for example, Si) having a high film forming speed may be selected as the other of the first metal and the second metal. In this case, the content of the one of the first metal and the second metal can be increased on the surface side (region B1) of the porous portion and the content of the other of the first metal and the second metal can be increased on the core portion side (region B3) of the porous portion.

In the case of step (ii), step (iii) and step (v), the contents of the first metal and the second metal may be changed in the thickness-wise direction (regions B1 to B3) of the porous portion by adjusting an adsorption time of the first metal (time during which the precursor gas containing the first metal is supplied). For example, the adsorption time of the first metal (time during which the precursor gas containing the first metal is supplied) may be shortened, the first metal may be adsorbed on the surface side of the porous portion, an un-adsorbed portion of the first metal may be formed on the core portion side of the porous portion, and a film of the second metal may be formed on the un-adsorbed portion. In this case, the content of the first metal can be increased on the surface side of the porous portion, and the content of the second metal can be increased on the core portion side of the porous portion.

Note that the ALD method can be performed under a temperature condition ranging from 100° C. to 400° C., inclusive, as compared with CVD generally performed under a temperature condition ranging from 400° C. to 900° C., inclusive. That is, the ALD method is excellent in that thermal damage to the metal foil can be suppressed.

Examples of the oxidizing agent used in the ALD method include water, oxygen, ozone, etc. The oxidizing agent may be supplied to the reaction chamber as an oxidizing agent-based plasma.

As a precursor containing the first metal and the second metal, for example, an organometallic compound containing the first metal and the second metal may be used. As a precursor containing the first metal, for example, an organometallic compound containing the first metal may be used. As a precursor containing the second metal, for example, an organometallic compound containing the second metal may be used. Thereby, the first metal and the second metal are easily chemisorbed to the object. As the precursor, various types of organometallic compounds, which are conventionally used in the ALD method, can be used.

Examples of the precursor containing Al include trimethylaluminum (($CH_3)_3Al$), etc.

Examples of the precursor containing Si include N-sec-butyl (trimethylsily) amine ($C_7H_{19}NSi$), 1,3-diethyl-1,1,3,3-tetramethyl di silazane ($C_8H_{23}NSi_2$), tetramethylsilane ($Si(CH_3)_4$), tetraethoxysilane ($Si(OC_2H_5)_4$), silicon tetrachloride ($SiCl_4$), etc.

Examples of the precursor containing Ti include bis (t-butylcyclopentadienyl) titanium (IV) dichloride ($C_{18}H_{26}C_{12}Ti$), tetrakis (dimethylamino) titanium (IV) ($[(CH_3)_2N]_4Ti$), titanium tetrachloride ($TiCl_4$), and titanium (IV) ethoxide ($Ti[O(C_2H_5)]_4$), etc.

Examples of the precursor containing Ta include (t-butylimido) tris (ethylmethylamino) tantalum (V) ($C_{13}H_{33}N_4Ta$), tantalum (V) pentaethoxide ($Ta(OC_2H_5)_5$), etc.

Examples of the precursor containing Zr include bis (methyl-η5 cyclopentadienyl) methoxymethylzirconium (Zr ($CH_3C_5H_4)_2CH_3OCH_3$), tetrakis (dimethylamido) zirconium (IV) ($[(CH_3)_2N]_4Zr$), zirconium (IV) t-butoxide (Zr $[OC(CH_3)_3]_4$), etc.

Examples of the precursor containing Hf include hafniumtetrachloride ($HfCl_4$), tetrakisdimethylaminohafnium (Hf $[N(CH_3)_2]_4$), hafnium-t-butoxide ($Hf[OC(CH_3)_3]_4$), etc.

Examples of the precursor containing Zn include zinc chloride, dimethylzinc, diethylzinc, etc.

Examples of the precursor containing Nb include niobium (V) ethoxide ($Nb(OCH_2CH_3)_5$, and tris(diethylamide)(t-butylimide) niobium (V) ($C_{16}H_{39}N_4Nb$), etc.

When the dissimilar metal composite layer is formed as a conductive layer, a precursor containing C (carbon) may be used together with the precursor containing the first metal and the second metal. Examples of the precursor containing C include alkanes having 5 to 11 carbon atoms such as hexane.

A source gas containing the first metal and the second metal and a source gas containing C may be alternately supplied to the reaction chamber to form a conductive layer in which the first metal, the second metal, and C are mixed.

Alternatively, the source gas containing the first metal and the second metal may be supplied to the reaction chamber to form a first conductive layer in which the first metal and the second metal are mixed, and then the source gas containing C may be supplied to the reaction chamber to form a second conductive layer containing C.

(Third Step)

The method for producing the electrode foil may further include a third step of chemically converting (anodizing) the electrode foil in which the surface of the base material is covered with the dissimilar metal composite layer (first layer). Thus, the second layer containing the oxide of the valve metal derived from the base material can be formed between the base material and the first layer. Thickness T2 of the second layer can be controlled based on the voltage applied to the electrode foil at the time of anodization.

In the ALD method, the source gas easily reaches the deepest portion of the etching pit, and the first layer can be stably formed from region B1 to region B3 of the porous portion. Hence, when the second layer is formed, the first layer which has an area larger than the second layer can also be formed from region B1 to region B3.

[Electrolytic Capacitor]

The electrolytic capacitor according to the present exemplary embodiment includes the above-described electrode foil for the electrolytic capacitor. The electrolytic capacitor includes, for example, the anode foil having the dielectric layer on the surface, and a cathode part covering at least a part of the dielectric layer. The cathode part includes, for example, the cathode foil and the electrolyte. In at least one of the anode foil and the cathode foil, the surface of the base material is covered with the dissimilar metal composite layer. In the case of the anode foil, the dissimilar metal composite layer is provided as an oxide layer (dielectric layer). In the case of the cathode foil, the dissimilar metal composite layer is provided as a conductive layer.

Hereinafter, components of the electrolytic capacitor other than the electrode foil will be described in detail.

(Electrolyte)

The electrolyte may contain a liquid component and/or a solid electrolyte. When the electrolyte does not contain a solid electrolyte, the liquid component is an electrolytic solution (liquid electrolyte). When the electrolyte contains a solid electrolyte, the liquid component may or may not be an electrolytic solution. The liquid component may have an action of improving the recoverability of the dielectric layer on the anode side of the electrolytic capacitor. As a solid electrolyte, a conductive polymer can be used.

(Conductive Polymer)

Examples of conductive polymer include polypyrrole, polythiophene, polyaniline, etc. One type of conductive polymer may be used alone, or two or more types of conductive polymer may be used in combination. The weight-average molecular weight of the conductive polymer ranges, for example, from 1,000 to 100,000, inclusive.

In the present description, polypyrrole, polythiophene, polyaniline, etc. are polymers having polypyrrole, polythiophene, polyaniline, etc. as a basic skeleton, respectively. Therefore, polypyrrole, polythiophene, polyaniline, etc. may include their respective derivatives. Examples of polythiophene include poly(3,4-ethylenedioxythiophene) (PEDOT), etc.

The conductive polymer may be doped with a dopant. One type of dopant may be used alone, or two or more types of dopant may be used in combination. It is desirable to use a polymer dopant from a viewpoint of suppressing dedoping of the dopant from the conductive polymer. Examples of the polymer dopant include anions of polyvinylsulfonic acid, polystyrenesulfonic acid, polyallylsulfonic acid, polyacrylsulfonic acid, polymethacrylsulfonic acid, etc. In particular, polystyrenesulfonic acid (PSS) is preferable. The weight-average molecular weight of the polymer dopant ranges, for example, from 1,000 to 100,000, inclusive.

(Liquid Component)

The liquid component may be a non-aqueous solvent or a mixture of a non-aqueous solvent and an ionic substance (a solute such as an organic salt) dissolved in the non-aqueous solvent (that is, an electrolytic solution). The non-aqueous solvent may be an organic solvent or an ionic liquid. Preferably, the non-aqueous solvent is a high-boiling-point solvent. Examples of the non-aqueous solvent include polyol compounds such as ethylene glycol, cyclic sulfone compounds such as sulfolane, lactone compounds such as γ-butyrolactone, amide compounds such as N-methylacetamide, ester compounds such as methyl acetate, carbonate compounds such as propylene carbonate, ether compounds such as 1,4-dioxane, and ketone compounds such as methyl ethyl ketone. As the high-boiling-point solvent, a polymer solvent may be used. Examples of the polymer solvent include polyalkylene glycols such as polyethylene glycol.

The liquid component may contain an acid component and a base component. As the acid component, an organic carboxylic acid can be used. The organic carboxylic acid may be an aliphatic carboxylic acid or an aromatic carboxylic acid. Examples of the organic carboxylic acid include maleic acid, phthalic acid, benzoic acid, pyromellitic acid, resorcin acid, etc.

The acid component may contain an inorganic acid. Examples of the inorganic acid include phosphoric acid, phosphorous acid, hypophosphorous acid, alkyl phosphoric acid ester, boric acid, fluoroboric acid, tetrafluoroboric acid, hexafluorophosphoric acid, benzenesulfonic acid, naphthalenesulfonic acid, etc.

Examples of the base component include primary amines such as monoalkylamine, secondary amines such as dialkylamine, tertiary amines such as trialkylamine, etc. As the base component, a compound having an alkyl-substituted amidine group (an imidazole compound, a benzimidazole compound, an alicyclic amidine compound, etc.) may be used. The compound having an alkyl-substituted amidine group may be a quaternized compound.

The liquid component may contain a salt of the acid component with the base component. The salt may be an inorganic salt or an organic salt. Examples of the organic salt include trimethylamine maleate, triethylamine borodisalicylate, ethyldimethylamine phthalate, mono-1,2,3,4-tetramethylimidazolinium phthalate, and mono-1,3-dimethyl-2-ethylimidazolinium phthalate, etc.

The pH of the liquid component may be less than 7, or less than or equal to 5. When the pH of the liquid component is set within the above range, dedoping of the dopant of the conductive polymer can be suppressed.

(Separator)

In the electrolytic capacitor using an electrolytic solution as the electrolyte, a separator can be used to separate the anode foil and the cathode foil from each other. As a material for the separator, it is possible to use, for example, a nonwoven fabric or a film containing, as a main component, cellulose, polyethylene terephthalate, polybutylene terephthalate, polyphenylenesulfide, vinylon, nylon, aromatic polyamide, polyimide, polyamideimide, polyetherimide, rayon, or a vitreous material, etc.

Figure 5:
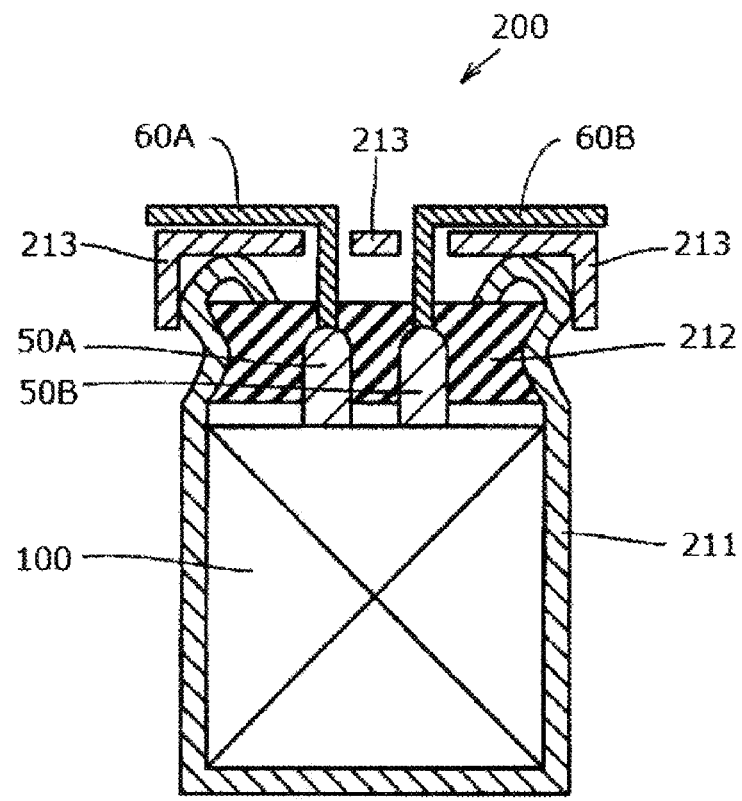
FIG. 5 is a schematic cross-sectional view illustrating an electrolytic capacitor.
Figure 6:
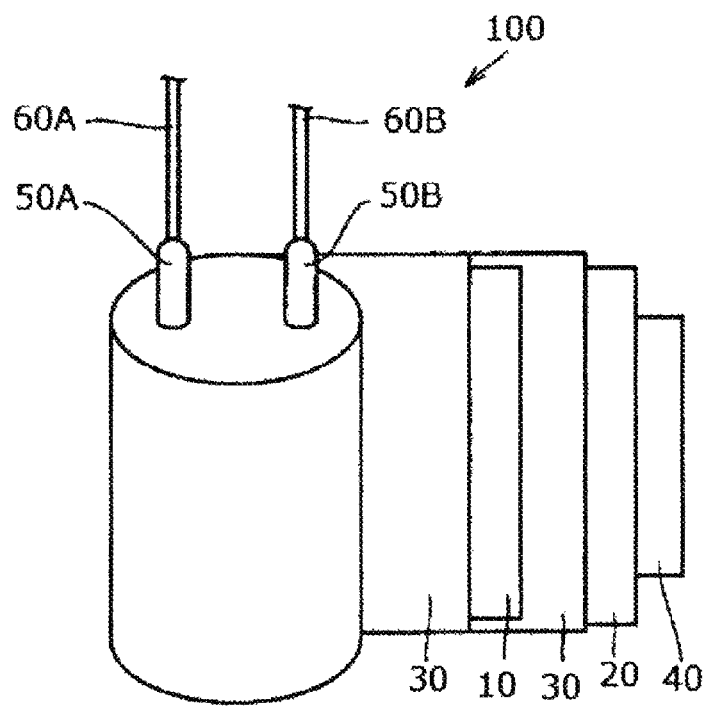
FIG. 6 is a perspective view schematically illustrating a configuration of a wound body included in the electrolytic capacitor.

Here, FIG. 5 is a schematic sectional view illustrating the electrolytic capacitor according to the present exemplary embodiment, and FIG. 6 is a schematic view in which a part of the wound body included in the electrolytic capacitor is unrolled. However, the following exemplary embodiment does not limit the present invention.

As shown in FIG. 5, electrolytic capacitor 200 includes a capacitor element and bottomed case 211 that accommodates the capacitor element. The capacitor element includes wound body 100 and a conductive polymer (not shown) attached to wound body 100. Electrolytic capacitor 200 includes: sealing member 212 that closes the opening of bottomed case 211; base plate 213 that covers sealing member 212; and lead wires 60A, 60B that are led out from sealing member 212 and penetrate base plate 213. The capacitor element is accommodated in bottomed case 211 together with a liquid component (not shown). The vicinity of the opening end of bottomed case 211 is drawn inward, and the opening end is curled to be crimped to sealing member 212.

Wound body 100 includes: anode foil 10, cathode foil 20, and separator 30 interposed between anode foil 10 and cathode foil 20. The conductive polymer is attached in a manner of covering at least a part of the surface of the dielectric layer of anode foil 10. Wound body 100 further includes: lead tab 50A connected to anode foil 10; and lead tab 50B connected to cathode foil 20. Lead tabs 50A, 50B are respectively connected to lead wires 60A, 60B.

Anode foil 10 and cathode foil 20 are wound with separator 30 interposed between anode foil 10 and cathode foil 20. The outermost circumference of the wound body is fixed by fastening tape 40. Note that FIG. 6 illustrates a state in which a part of the wound body is unrolled before the outermost circumference of the wound body is fixed.

In the above exemplary embodiment, a wound electrolytic capacitor has been described, but the application range of the present invention is not limited thereto, and the present invention can also be applied to other electrolytic capacitors, for example, laminated electrolytic capacitors.

The electrode foil for the electrolytic capacitor of the present disclosure is suitably used in an electrolytic capacitor required to have high performance and high reliability.

The invention claimed is:

1. An electrode foil for an electrolytic capacitor, the electrode foil comprising:
   a base material that includes a porous portion comprising pores and a core portion continuous with the porous portion, the base material containing a valve metal; and
   a dissimilar metal composite layer disposed along an inner wall surface of each of the pores of the porous portion, wherein:
   the dissimilar metal composite layer includes a mixed region where a first metal and a second metal are mixed, the second metal being different from the first metal,
   the mixed region constitutes at least 50% of the dissimilar metal composite layer in a thickness-wise direction of the dissimilar metal composite layer,
   a content M1 of the first metal with respect to all metals in the mixed region is 1 atomic % or more,
   a content M2 of the second metal with respect to all metals in the mixed region is 1 atomic % or more, and
   when three regions obtained by equally dividing the mixed region are defined as a region A1, a region A2, and a region A3 that are arranged in a stated order from a side close to the surface of the dissimilar metal composite layer in the thickness-wise direction of the dissimilar metal composite layer,
   $0.8 \leq R_{A2}/R_{A1} \leq 1.2$ and $0.8 \leq R_{A3}/R_{A2} \leq 1.2$ are satisfied,
   where $R_{A1}$ denotes an atomic ratio of the first metal to the second metal in the region A1,
   $R_{A2}$ denotes an atomic ratio of the first metal to the second metal in the region A2, and
   $R_{A3}$ denotes an atomic ratio of the first metal to the second metal in the region A3.

2. The electrode foil according to claim 1, wherein:
   the content M1 of the first metal with respect to all metals in the mixed region is 1 atomic % or more and 99 atomic % or less, and
   the content M2 of the second metal with respect to all metals in the mixed region is 1 atomic % or more and 99 atomic % or less.

3. The electrode foil according to claim 1, wherein $0.9 \leq M1_{A2}/M1_{A1} \leq 1.1$, $0.9 \leq M1_{A3}/M1_{A2} \leq 1.1$, $1 \leq M1_{A1}$, $1 \leq M1_{A2}$, and $1 \leq M1_{A3}$ are satisfied,
   where $M1_{A1}$ denotes a content in atomic % of the first metal with respect to all metals in the region A1,
   $M1_{A2}$ denotes a content in atomic % of the first metal with respect to all metals in the region A2, and
   $M1_{A3}$ denotes a content in atomic % of the first metal with respect to all metals in the region A3.

4. The electrode foil according to claim 1, wherein $0.9 \leq M2_{A2}/M2_{A1} \leq 1.1$, $0.9 < M2_{A3}/M2_{A2} \leq 1.1$, $1 \leq M2_{A1}$, $1 \leq M2_{A2}$, and $1 \leq M2_{A3}$ are satisfied, where $M2_{A1}$ denotes a content in atomic % of the second metal with respect to all metals in the region A1, $M2_{A2}$ denotes a content in atomic % of the second metal with respect to all metals in the region A2, and $M2_{A3}$ denotes a content in atomic % of the second metal with respect to all metals in the region A3.

5. The electrode foil according to claim 1, wherein
when three regions obtained by equally dividing the porous portion are defined as a region B1, a region B2, and a region B3 that are arranged in a stated order from a side opposite to the core portion in the thickness-wise direction of the porous portion, $R_{B3} < R_{B2} < R_{B1}$ is satisfied, where $R_{B1}$ denotes an atomic ratio of the first metal to the second metal in the region B1, $R_{B2}$ denotes an atomic ratio of the first metal to the second metal in the region B2, and $R_{B3}$ denotes an atomic ratio of the first metal to the second metal in the region B3.

6. The electrode foil according to claim 5, wherein $M1_{B3} < M1_{B2} < M1_{B1}$ is satisfied, where $M1_{B1}$ denotes a content in atomic % of the first metal with respect to all metals in the region B1, $M1_{B2}$ denotes a content in atomic % of the first metal with respect to all metals in the region B2, and $M1_{B3}$ denotes a content in atomic % of the first metal with respect to all metals in the region B3.

7. The electrode foil according to claim 5, wherein $M2_{B1} < M2_{B2} < M2_{B3}$ is satisfied, where $M2_{B1}$ denotes a content in atomic % of the second metal with respect to all metals in the region B1, $M2_{B2}$ denotes a content in atomic % of the second metal with respect to all metals in the region B2, and $M2_{B3}$ denotes a content in atomic % of the second metal with respect to all metals in the region B3.

8. The electrode foil according to claim 1, wherein:
the first metal includes at least one selected from the group consisting of titanium, tantalum, hafnium, zirconium, and zinc, and
the second metal includes at least one selected from the group consisting of silicon and aluminum.

9. The electrode foil according to claim 1, wherein:
the first metal is titanium and the second metal is silicon, and
a content of the silicon with respect to all metals in the mixed region is 1 atomic % or more and 70 atomic % or less.

10. The electrode foil according to claim 1, wherein:
the first metal is titanium and the second metal is aluminum, and
a content of the aluminum with respect to all metals in the mixed region is 1 atomic % or more and 55 atomic % or less.

11. The electrode foil according to claim 1, wherein the dissimilar metal composite layer is an oxide layer.

12. The electrode foil according to claim 11, wherein:
the mixed region contains an impurity,
the impurity is at least one selected from the group consisting of hydrogen, carbon, and nitrogen, and
a content of the impurity in the mixed region is 25 atomic % or less with respect to a total of all metals and the impurity in the mixed region.

13. The electrode foil according to claim 12, wherein a content of the hydrogen in the mixed region is 10 atomic % or less with respect to the total of all metals and the impurity in the mixed region.

14. The electrode foil according to claim 1, wherein the dissimilar metal composite layer contains a conductive carbon.

15. The electrode foil according to claim 1, further comprising a layer containing an oxide of the valve metal between the base material and the dissimilar metal composite layer.

16. An electrolytic capacitor comprising the electrode foil according to claim 1.

17. The electrode foil according to claim 1, wherein a thickness of the dissimilar metal is in a range from 4 nm to 100 nm.

18. The electrode foil according to claim 1, wherein the region A3 is adjacent to the inner wall surface of each of the pores of the porous portion.

19. The electrode foil according to claim 1, wherein the region A3 directly contacts the inner wall surface of each of the pores of the porous portion.

* * * * *